(12) United States Patent
Kaltenmark et al.

(10) Patent No.: US 7,415,509 B1
(45) Date of Patent: Aug. 19, 2008

(54) OPERATIONS ARCHITECTURES FOR NETCENTRIC COMPUTING SYSTEMS

(75) Inventors: John K. Kaltenmark, St. Charles, IL (US); Christopher M. Degiorgio, Chicago, IL (US)

(73) Assignee: Accenture LLP, Palo Alto, CA (US)

( * ) Notice: Subject to any disclaimer, the term of this patent is extended or adjusted under 35 U.S.C. 154(b) by 874 days.

(21) Appl. No.: 09/676,584

(22) Filed: Sep. 29, 2000

Related U.S. Application Data (60) Provisional application No. 60/156,962, filed on Oct. 1, 1999.

(51) Int. Cl.
G06F 15/16 (2006.01)
(52) U.S. Cl. .............. 709/219; 709/203; 709/224; 709/217
(58) Field of Classification Search ........ 709/232, 709/228, 219, 203, 224, 217; 717/101
See application file for complete search history.

(56) References Cited

U.S. PATENT DOCUMENTS

| | | | |
|---|---|---|---|
| 4,809,170 A | 2/1989 | Leblang et al. ............ 364/200 |
| 5,495,610 A | 2/1996 | Shing et al. | |
| 5,535,388 A | 7/1996 | Takeda ...................... 395/650 |
| 5,590,270 A | 12/1996 | Tsukuda et al. ............ 395/701 |
| 5,602,997 A | 2/1997 | Carpenter et al. | |
| 5,619,716 A | 4/1997 | Nonaka et al. ............. 395/800 |
| 5,710,915 A | 1/1998 | McElhiney ................. 395/603 |
| 5,737,533 A | 4/1998 | de Hond ................ 395/200.49 |
| 5,742,829 A | 4/1998 | Davis et al. | |
| 5,745,753 A | 4/1998 | Mosher, Jr. ................ 395/618 |
| 5,758,150 A | 5/1998 | Bell et al. .................. 395/610 |
| 5,761,071 A | 6/1998 | Bernstein et al. ....... 364/479.07 |
| 5,781,732 A | 7/1998 | Adams ................. 395/200.35 |
| 5,799,297 A | 8/1998 | Goodridge et al. ............ 707/1 |

(Continued)

FOREIGN PATENT DOCUMENTS

EP   0520923 A2   12/1992

(Continued)

OTHER PUBLICATIONS

Tilley, S.R., Storey, M.A.D., "Repot of the STEP '97 Workshop on Net-Centric Computing," Software Engineering Institute, Carnegie Mellon University, Pittsburgh, PA pp. 1-12, CMU/SEI-97-SR-016, Oct. 1997, © 1997 by Carnegie Mellon University.

(Continued)

*Primary Examiner*—William C. Vaughn, Jr.
*Assistant Examiner*—Djenane M Bayard
(74) *Attorney, Agent, or Firm*—Brinks Hofer Gilson & Lione (57) ABSTRACT

An operations architecture for a netcentric computing system including a server connected with a client. The preferred operations architecture includes a software distribution tool, a configuration and asset management tool, a fault management and recovery management tool, a capacity planning tool, a performance management tool, a license management tool, a remote management tool, a event management tool, a systems monitoring and tuning tool, a security tool, a user administration tool, a production control application set and a help desk tool that support the server and the client in the netcentric computing system.

10 Claims, 3 Drawing Sheets

U.S. PATENT DOCUMENTS

| | | | |
|---|---|---|---|
| 5,805,785 A | 9/1998 | Dias et al. | |
| 5,835,090 A | 11/1998 | Clark et al. | 345/339 |
| 5,859,969 A | 1/1999 | Oki et al. | |
| 5,860,012 A | 1/1999 | Luu | |
| 5,870,759 A | 2/1999 | Bauer et al. | 707/201 |
| 5,877,759 A | 3/1999 | Bauer | 345/339 |
| 5,892,905 A | 4/1999 | Brandt et al. | 395/187.01 |
| 5,892,909 A | 4/1999 | Grasso et al. | 395/200.31 |
| 5,905,868 A | 5/1999 | Baghai et al. | |
| 5,911,071 A | 6/1999 | Jordan | |
| 5,924,096 A | 7/1999 | Draper et al. | 707/10 |
| 5,930,512 A | 7/1999 | Boden et al. | 395/710 |
| 5,933,582 A | 8/1999 | Yamada | |
| 5,956,400 A | 9/1999 | Chaum et al. | 380/4 |
| 5,956,479 A | 9/1999 | McInerney et al. | 395/183.14 |
| 5,999,931 A | 12/1999 | Breitbart et al. | 707/10 |
| 6,006,171 A | 12/1999 | Vines et al. | 702/184 |
| 6,012,071 A | 1/2000 | Krishna et al. | 707/522 |
| 6,023,698 A | 2/2000 | Lavey, Jr. et al. | 707/10 |
| 6,029,192 A | 2/2000 | Hill et al. | 709/206 |
| 6,038,560 A | 3/2000 | Wical | 707/5 |
| 6,061,695 A | 5/2000 | Slivka et al. | 707/513 |
| 6,067,577 A | 5/2000 | Beard | |
| 6,081,518 A | 6/2000 | Bowman Amuah | |
| 6,112,304 A | 8/2000 | Clawson | |
| 6,122,630 A | 9/2000 | Strickler et al. | 707/8 |
| 6,144,975 A | 11/2000 | Harris, Jr. et al. | 707/901 |
| 6,147,975 A | 11/2000 | Bowman Amuah | |
| 6,157,706 A | 12/2000 | Rachelson | 379/100.08 |
| 6,185,573 B1 | 2/2001 | Angelucci et al. | 707/104 |
| 6,195,697 B1 | 2/2001 | Bowman Amuah | |
| 6,256,773 B1 | 7/2001 | Bowman-Amuah | 717/1 |
| 6,289,382 B1 | 9/2001 | Bowman-Amuah | 709/226 |
| 6,321,263 B1 | 11/2001 | Luzzi et al. | |
| 6,324,647 B1 | 11/2001 | Bowman Amuah | |
| 6,332,163 B1 | 12/2001 | Bowman Amuah | |
| 6,339,832 B1 | 1/2002 | Bowman Amuah | |
| 6,345,239 B1 | 2/2002 | Bowman Amuah | |
| 6,366,912 B1 | 4/2002 | Wallent et al. | |
| 6,370,573 B1 | 4/2002 | Bowman Amuah | |
| 6,385,655 B1 | 5/2002 | Smith et al. | 709/232 |
| 6,401,097 B1 | 6/2002 | McCotter et al. | 707/102 |
| 6,405,364 B1 | 6/2002 | Bowman-Amuah | 717/101 |
| 6,418,430 B1 | 7/2002 | DeFazio et al. | 707/3 |
| 6,426,948 B1 | 7/2002 | Bowman Amuah | |
| 6,427,132 B1 | 7/2002 | Bowman Amuah | |
| 6,434,568 B1 | 8/2002 | Bowman Amuah | |
| 6,434,628 B1 | 8/2002 | Bowman Amuah | |
| 6,438,594 B1 | 8/2002 | Bowman Amuah | |
| 6,442,547 B1 | 8/2002 | Bowman Amuah | |
| 6,442,748 B1 | 8/2002 | Bowman Amuah | |
| 6,449,588 B1 | 9/2002 | Bowman Amuah | |
| 6,457,066 B1 | 9/2002 | Mein et al. | |
| 6,477,580 B1 | 11/2002 | Bowman Amuah | |
| 6,477,665 B1 | 11/2002 | Bowman Amuah | |
| 6,496,850 B1 | 12/2002 | Bowman Amuah | |
| 6,502,213 B1 | 12/2002 | Bowman Amuah | |
| 6,523,027 B1 | 2/2003 | Underwood | 707/4 |
| 6,529,909 B1 | 3/2003 | Bowman Amuah | |
| 6,529,948 B1 | 3/2003 | Bowman-Amuah | 709/217 |
| 6,539,396 B1 | 3/2003 | Bowman Amuah | |
| 6,542,593 B1 | 4/2003 | Bowman Amuah | |
| 6,549,949 B1 | 4/2003 | Bowman Amuah | |
| 6,550,057 B1 | 4/2003 | Bowman Amuah | |
| 6,556,659 B1 | 4/2003 | Bowman Amuah | |
| 6,571,282 B1 | 5/2003 | Bowman Amuah | |
| 6,578,068 B1 | 6/2003 | Bowman Amuah | |
| 6,584,466 B1 | 6/2003 | Serbinis et al. | 707/10 |
| 6,598,046 B1 | 7/2003 | Goldberg et al. | 707/5 |
| 6,601,192 B1 | 7/2003 | Bowman Amuah | |
| 6,601,234 B1 | 7/2003 | Bowman Amuah | |
| 6,606,660 B1 | 8/2003 | Bowman Amuah | |
| 6,606,744 B1 * | 8/2003 | Mikurak | 717/174 |
| 6,611,867 B1 | 8/2003 | Bowman Amuah | |
| 6,615,199 B1 | 9/2003 | Bowman Amuah | |
| 6,615,258 B1 | 9/2003 | Barry et al. | 709/223 |
| 6,636,242 B2 | 10/2003 | Bowman Amuah | |
| 6,640,238 B1 | 10/2003 | Bowman Amuah | |
| 6,640,244 B1 | 10/2003 | Bowman Amuah | |
| 6,640,249 B1 | 10/2003 | Bowman Amuah | |
| 6,662,357 B1 | 12/2003 | Bowman-Amuah | 717/120 |
| 6,697,824 B1 | 2/2004 | Bowman Amuah | |
| 6,704,303 B1 | 3/2004 | Bowman Amuah | |
| 6,707,812 B1 | 3/2004 | Bowman Amuah | |
| 6,715,145 B1 | 3/2004 | Bowman Amuah | |
| 6,721,713 B1 | 4/2004 | Guheen et al. | 705/1 |
| 6,742,015 B1 | 5/2004 | Bowman Amuah | |
| 6,745,209 B2 | 6/2004 | Holenstein et al. | 707/203 |
| 6,874,010 B1 | 3/2005 | Sargent | 709/203 |
| 6,988,249 B1 | 1/2006 | Arvanitis et al. | 715/853 |
| 7,020,697 B1 | 3/2006 | Goodman et al. | 709/223 |
| 7,068,680 B1 | 6/2006 | Kaltenmark et al. | 370/469 |
| 2001/0052108 A1 * | 12/2001 | Bowman-Amuah | 717/1 |
| 2002/0120553 A1 | 8/2002 | Bowman Amuah | |
| 2002/0133328 A1 | 9/2002 | Bowman Amuah | |
| 2003/0058277 A1 | 3/2003 | Bowman Amuah | |
| 2004/0030705 A1 | 2/2004 | Bowman Amuah | |
| 2004/0030749 A1 | 2/2004 | Bowman Amuah | |
| 2004/0107125 A1 * | 6/2004 | Guheen et al. | 705/7 |
| 2005/0080665 A1 | 4/2005 | Bowman-Amuah | 705/14 |
| 2005/0283518 A1 | 12/2005 | Sargent | 709/201 |
| 2006/0059253 A1 | 3/2006 | Goodman et al. | 709/223 |

FOREIGN PATENT DOCUMENTS

| | | |
|---|---|---|
| EP | 0697655 A2 | 2/1996 |
| EP | 0697691 A2 | 2/1996 |
| EP | 0769739 A2 | 4/1997 |
| EP | 0810520 A1 | 12/1997 |
| EP | 0 829 808 A3 | 3/1998 |
| EP | 0841616 A2 | 5/1998 |
| EP | 0 915 422 A1 | 5/1999 |
| GB | 2315891 A | 2/1998 |
| WO | WO92/20022 A1 | 11/1992 |
| WO | WO95/23373 | 8/1995 |
| WO | WO97/12311 | 4/1997 |
| WO | WO98/52121 A2 | 11/1998 |
| WO | WO98/52121 A3 | 11/1998 |
| WO | WO98/53396 A1 | 11/1998 |
| WO | WO98/54660 | 12/1998 |
| WO | WO98/57260 | 12/1998 |
| WO | WO99/38079 | 7/1999 |

OTHER PUBLICATIONS

Lavva, B., Holder, O., Ben-Shaul, I., "Object Management for Network-Centric Systems with Mobile Objects," http://citeseer.ist.edu/update/613778, printed Dec. 12, 2005, © Penn State and NEC.

Farabaugh, B., "Net-Centric Computing: Architecting a Distributed Data-Management Infrastructure," Military Embedded Systems, pp. 1-14, printed from http://www.mil-embedded.com/articles/white_papers/farabaugh, printed Dec. 12, 2005, © MMV Military Embedded Systems. An OpenSystems Publication LLC publication.

Cole, B., "What is Net-Centric Computing?" Embedded.com, URL http://222.embedded.com/showArticle.jhtml?articleID=9900077, Mar. 15, 2001, © CMP Media LLC.

Cole, B., "XP and net-centric computing?" Embedded.com, URL http://www.embedded.com/showArticle.jhtml?articleID=900341, Sep. 2001.

Copyright Registration for Netcentric Computing: Computing, Communications and knowledge, Reg. 9 Jan. 1998, p. 1.

Kramer, D., The Java™ Platform: A White Paper, JavaSoft, pp. 1-25, May 1996.

www.empowermentzone.com/javacomp.txt, Sun Microsystems, pp. 1-18, 1996.

Engestrom, J., "Software Agents, Towards Transparent Mediation, A Technology Report for Salama Interactive," Jan. 1999, pp. 1-19.

Morris, K.C. and Flater, D., "Standards-based software testing in a Net-Centric World" pp. 1-8 (cited by Examiner, no date given).

Raje, R. and Chinnasamy, S., "Designing a distributed computing environment for global scale systems: challenges and issues," ACM SIGAPP Applied Computing Review, vol. 7, Issue 1, Spring 1999, pp. 25-30.

Co-pending patent application, U.S. Appl. No. 09/386,917, filed Aug. 31, 1999; 340 pages, Inventor Michael K. Bowman-Amuah.

Co-pending patent application, U.S. Appl. No. 10/647,411, filed Aug. 25, 2003; 22 pages, Inventor Michael K. Bowman-Amuah.

Co-pending patent application, U.S. Appl. No. 09/387,654, filed Aug. 31, 1999; 818 pages, Inventor Michal K. Bowman-Amuah.

Billy B.L. Lim, "Teaching web development technologies in CS/IS curricula," ACM, copyright 1998, pp. 107-111.

Litoiu et al., "A performance engineering tool and method for distributed applications," ACM, pp. 1-14.

Zoller et al., "A toolkit for an automatic, data dictionary based connection of databases to the WWW," ACM, copyright 1998, pp. 706-718.

McDowell et al., "Unloading Java classes that contain static fields," ACM, v. 33(1), Oct. 15, 1997, pp. 56-60.

Orfali, R., Harkey, D., Edwards, J., "Intergalactic Client/Server Computing, " Byte, McGraw-Hill, Inc., St. Peterborough, U.S., vol. 20, No. 4, Apr. 1, 1995, pp. 108-110, 114, 11, XP000501823, ISSN: 0360-5280.

Smeets, J., Boyer, S., "Internet and Client Server Patent Information Systems: New Services from Derwent," World Patent Information, GB, Elsevier Sciences Publishing, Barking, vol. 20, No. 2, Jun. 1998, pp. 136-139, XP004165804, ISSN 0172-2190.

Orfali, R., Harkey, D., "Client/Server With Distributed Objects," Byte, McGraw-Hill, Inc., St. Peterborough, U.S., vol. 20, No. 4, Apr. 1, 1995, pp. 151-152, 154, 156, XP000501827, ISSN 0360-5280.

Aoyama, M., Hanai, Y., Suzuki, M., "An Integrated Software Maintenance Environment: Bridging Configuration Management and Quality Management," Proceedings of the Conference on Software Maintenance, International Conference on Software Maintenance, Washington, US, IEEE Computer Society Press, Oct. 24, 1988 pp. 40-44.

Borsook, P., "Seeking Security. Mainframe Techniques Define System Security. Soon, they'll be Adapted To Distributed Client/Server Systems." Byte, McGraw-Hill, Inc., St. Peterborough, vol. 18, No. 6, May 1, 1993, pp. 119-122, 124, 12, XP000359327, ISSN 0360-5280.

Tanenbaum, A., "Computer Networks—Third Edition," Prentice-Hall International, London, GB, 1996, pp. 28-39, XP002161723.

Slakeley, J.A., "Universal Data Access with OLE DB," Proceedings of IEEE Compcon, U.S. Los Alamitos, IEEE Computer Society Press, Feb. 23, 1997, pp. 2-7.

Voth, G.R., Kindel, C., Fujioka, J., "Distributed Application Development for Three-Tier Architectures: Microsoft on Windows DNA," IEEE Internet Computing vol. 2, No. 2, Mar./Apr. 1998, USA.

Lambert, N., "A New Patent Search Tool For The Internet. Q-PAT US." Database, US, Cincinnati, vol. 19, No. 4, Aug. 1, 1996.

Abdel-Mottaleb, M., Hsiang-Lung, W., Dimitrova, N., "Aspects of Multimedia Retrieval," Philips Journal of Research, NL, Elsevier, Amsterdam, vol. 50, No. 1, 1996, pp. 227-251.

Olson, M.A., "DataBlade extensions for INFORMIX-Universal Server," Compcon '97 Proceedings, IEEE, 1997, pp. 143-148.

Chamberlin, D.D., "Evolution of Object-Relational Database Technology in DB2," Compcon'97 Proceedings, IEEE, 1997, pp. 131-135.

Nori, A.K., Kumar, S., "Bringing Objects to the Mainstream," Compcon '97 Proceedings, IEEE, 1997, pp. 136-142.

"Data Joiner: A Multidatabase Server Version 1," White Paper, IBM Data Management Solutions, IBM, USA, second edition (May 1995).

"Effective Systems management for DB2 Universal Database," White Paper, IBM Data Management Solutions, IBM, USA, first edition (Dec. 1996).

Pleas, K., "Ole's Missing Links," BYTE, McGraw-Hill Inc., St. Peterborough, US, vol. 21, No. 4, Apr. 1, 1996, pp. 99-102 X-000586036, ISSN 0360-5280.

Burke, M.G., Choi, J.D., Fink, S., Grove, D., Hind, M., Sarkar, V., Serrano, M.J., Sreedhar, V.C., Srinivasan, H., "The Jalapeno Dynamic Optimizing Compiler for Java," Java '99, San Francisco, CA, US, ACM Jun. 12, 1999, pp. 129-141 XP002134655.

Cramer, T., Friedman, R., Miller, T., Seberger, D., Wilson, R., Wolczko, M., "Compiling Java Just in Time," IEEE Micro, IEEE Inc., New York, US, vol. 17, No. 3, May 1, 1997, pp. 36-43 XP000656035, ISSN: 0272-1732.

Bank, J.S., "Java Security," Dec. 8, 1995, pp. 1-13, X-002092325.

Koved, L., Nadalin, A.J., Neal, D., Lawson, T., "The Evolution of Java Security," IBM, The Ultimate Resource for Java Developers, 1998, pp. 1-14, XP002144222.

Touch, J., Hughes, A.S., "LSAM proxy cache: a multicast distributed virtual cache," Computer Networks and ISDN Systems, North Holland Publishing, Amsterdam, NL (3W3 Workshop, University of Manchester, Jun. 15-17, 1998), vol. 30, No. 22-23, Nov. 25, 1998, pp. 22-23.

Clip, P., "Servlets: CGI The Java Way," BYTE, McGraw-Hill, Inc., St. Peterborough, US, vol. 23, No. 5, May 1, 1998, pp. 55-56.

Gwertzman, J.S., Seltzer, M., "The Case For Geographical Push-Caching," Workshop on Hot Topics in Operating Systems, May 4, 1995, pp. 51-55.

Chamberlin, D.D., "Using the new DB2: IBM's object-relational database system," Morgan Kaufmann Publishers, USA, 1996, ISBN 1-55860-373-5, ppl. 561-567.

North, K., "Database Programming with OLE and ActiveX," DBMS, US, M&T Publ., Redwood City, CA, US, Nov. 1996, pp. 1-8.

Joshi, S.M., Veeramani, D., "Book Review. Increasing the Interoperability of CAD Packages. CAD and Office Integration: OLE for Design and Modeling—A New Technology for CA-Software," Computer Aided Design, Elsevier Publishers BV, Barking, GB, vol. 29, No. 12, Dec. 1, 1997, pp. 907.

Schmoll, J. "Wird OLE for Process Controll (OPC) Ein Neuer Industriestandard?", Automatisierungstechnische Praxis, ATP, Oldenbourg Verlag, Munchen, DE, vol. 39, No. 5, May 1, 1997, pp. 11-12, 14-17.

Williams, S., Kindel, C., "The Component Object Model. The Foundation for OLE Services," Dr. Dobb's Special Report. Winter, 1994/1995, vol. 19, No. 16, Dec. 21, 1994 pp. 14-22.

Smith, D., Tilley, S.R., Weiderman, N.H., "Transforming Legacy Application into Object-Oriented Applications Workshop, Will Net-Centric Computing Change the Reengineering Equation?" 1996, pp. 1-4.

Hamilton, M.A., "Java and the shift to Net-centric computer," Sun Microsystems, Computer, paper published Aug. 1996, ISSN: 0018-9162, Aug. 1996, pp. 31-39.

Orfali, R., Harkey, D., "Client/Server Programming with OS/2 2.0 (2nd Ed.)" 1992, Van Nostrand Reinhold New York, U.S., pp. 10-24, 111-137, 149-160, 588-594, XP002164217, ISBN 0-442-01219-5.

IBM Technical Disclosure Bulletin, "Security, License Management and Application Metering Process for Controlling Applications in the DOS Environment," IBM Corp., New York, US, vol. 37, No. 11, pp. 195-199, Nov. 1, 1994.

Ryan, H.W., Sargent, S.R., Boudreau, T.M., Arvanitis, Y.S., Taylor, S.J., Mindrum, C.; "Practical Guide to Client/Server Computing," Second Edition, pp. 1-774; Copyright 1998, CRC Press LLC, Boca Raton, Fl, United States.

Ryan, H.W.; Alber, M.W.; Taylor, S.J.; Chang, R.A.; Arvanitis, Y.S.; Davis, M.C.; Mullen, N.K.; Dove, S.L.; Mehra, P.N.; Mindrum, C.; "Netcentric Computing, Computing, Communications and Knowledge," pp. 1-413; Copyright 1998, CRC Press LLC, Boca Raton, FL, United States.

Meisl, P., Mabo, R.I., Cumming, I.G., "Parallel Synthetic Aperture Radar Processing on Workstation Networks," IEEE, Apr. 15-19, 1996, pp. 1-8;.

Schneider, R.D., "Horizontal and Vertical Partitioning," Windows IT Pro, Feb. 1997, 3 pgs. http://www.windowsitpro.com/Windows/Article/ArticleD/98/98.html.

Agrawal, S., Narasayya, V., Yang, B., "Integrating Vertical and Horizontal Partitioning into Automated Physical Database Design," ACM, pp. 359-370, Jun. 13-18, 2004 © 2004 ACM.

* cited by examiner

OPERATIONS ARCHITECTURES FOR NETCENTRIC COMPUTING SYSTEMS

This application claims the benefit under 35 U.S.C. §119 (e) of U.S. provisional application Ser. No. 60/156,962 filed on Oct. 1, 1999. In addition, the following commonly owned patent application and patents are related to this application: U.S. patent application Ser. No. 09/677,134, filed Sep. 29, 2000, entitled DATA MANAGEMENT FOR NETCENTRIC COMPUTING SYSTEMS; U.S. Pat. No. 6,874,010, issued Mar. 29, 2005, entitled BASE SERVICE ARCHITECTURES FOR NETCENTRIC COMPUTING SYSTEMS; U.S. Pat. No. 6,988,249, issued Jan. 17, 2006, entitled PRESENTATION SERVICE ARCHITECTURES FOR NETCENTRIC COMPUTING SYSTEMS; U.S. Pat. No. 7,020,697, issued Mar. 28, 2006, entitled ARCHITECTURES FOR NETCENTRIC COMPUTING SYSTEMS; U.S. Pat. No. 7,068,680, issued Jun. 27, 2006, entitled COMMUNICATION SERVICE ARCHITECTURES FOR NETCENTRIC COMPUTING SYSTEMS; U.S. patent application Ser. No. 11/208,491, filed Aug. 22, 2005, entitled ENVIRONMENT SERVICE ARCHITECTURES FOR NETCENTRIC COMPUING SYSTEMS; and U.S. patent application Ser. No. 11,238,895, filed Sep. 29, 2005, entitled ARCHITECTURES FOR NETCENTRIC COMPUTING SYSTEMS.

FIELD OF THE INVENTION

The present invention relates generally to business computing systems, and more particularly, to an operations architecture for netcentric computing systems.

BACKGROUND OF THE INVENTION

Computer-based business solutions have existed for various different types of transactions since the mid-to-late 1960s. During this time period, the technology focused on the use of batch technology. In batch processing, the business user would present a file of transactions to the application. The computer system would then run through the transactions, processing each one, essentially without user intervention. The system would provide reporting at some point in the batch processing. Typically, the reports would be batch-printed, which, in turn, would be used by the business user to correct the input transactions that were resubmitted along with the next batch of transactions.

In the 1970s, businesses began a transition to on-line, interactive transactions. At a conceptual level, this processing opened up the file of transactions found in batch transactions and allowed the user to submit them one at a time, receiving either immediate confirmation of the success of the transaction or else feedback on the nature of the transaction error. The conceptually simple change of having the user interact with the computer on a transaction-at-a-time basis caused huge changes in the nature of business computing. More important, users saw huge changes in what they could do on a day-to-day basis. Customers were no longer forced to wait for a batch run to process the particular application. In essence, the computer had an impact on the entire work flow of the business user.

Along with the advent of on-line interactive systems, it was equally significant that the systems provided a means for the business user to communicate with others in the business as the day-to-day business went along. This capability was provided on the backbone of a wide area network (WAN). The WAN was in itself a demanding technology during this time period and, because of these demands, telecommunications groups emerged within organizations, charged with the responsibility to maintain, evolve and manage the network over a period of time.

The theme of the 1980s was database management systems (DBMSs). Organizations used and applied database technology in the 1970s, but in the 1980s, they grew more confident in the application of DBMS technology. Because of the advances in network technology, the focus was now on the sharing of data across organizational and application boundaries. Curiously, database technology did not change the fundamental way in which business processing was done. DBMS made it more convenient to access the data and to ensure that it could be updated while maintaining the integrity of the data.

In the 1990s, technology began to shift toward client/server computing. Client/server computing is a style of computing involving multiple processors, one of which is typically a workstation, and across which a single business transaction is completed. Using the workstation, the transaction entered by the user could now be processed on a keystroke-by-keystroke basis.

Furthermore, there was a change in the communications. With client/server, users could communicate with others in the work group via a local area network (LAN). The LAN permitted workstation-to-workstation communications at speeds of 100 to 1,000 times what was typically available on a WAN. The LAN was a technology that could be grown and evolved in a local office with little need for direct interaction from the telecommunications group.

During the late 1990s, the Internet began to receive widespread use by consumers and businesses. In the business world, the Internet has caused the concept of business users to expand greatly because of the way in which computers are now capable of being interconnected. In addition, the cost of computers has dropped to the point that it is affordable for almost every household to own a computer if so desired. As such, a need to expand the reach of computing both within and outside the enterprise, and that enables the sharing of data and content between individuals and applications has developed.

In the mainframe environment, operations tasks are performed by those in the data center who constantly watch monitor, and react to problems with the host or network. Keeping a mission-critical client/server application system available and under control, while providing a high level of service to the end user, is more complex and difficult than in a mainframe environment. Unfortunately, not all organizations are aware of this complexity, as they should be.

When client/server computing first emerged, organizations expected the cost and complexity of operations to be reduced because of reduced administration and because of common operating systems on workstations and servers. Time has shown that client/server environments tend instead to add rather than reduce complexity, therefore increasing operations costs.

More recently, netcentric computing has emerged as the next technology generation which will coexist with host and client/server environments. Again, while the initial hype around netcentric suggested that it would significantly simplify operations, experience is beginning to indicate that netcentric only adds an additional level of complexity through additional processes, tools, and support services, thus creating an environment even more potentially difficult and expensive to manage. The operations architecture now needs not only to keep an organization's internal production systems up and running, but also to maintain production systems that extend to business partners and customers.

The complexity and cost of operations architecture keeps increasing, which suggests a strong need for a structured and disciplined approach to implementation of tools and technologies to support eased operations.

SUMMARY OF THE INVENTION

The present invention discloses an operations architecture, as well as a method of providing an operations architecture, for a netcentric computing system that includes a server connected with a client. The client may be a remote client or a client that is connected with the network of the netcentric computing system through a LAN connection or some other equivalent network connection. Preferentially, the client accesses all of the tools and resources of the netcentric computing system through a web browser application that interacts with the server of the netcentric computing system.

The preferred operations architecture includes a software distribution tool for providing automated delivery to, and installation of, an application on the server or the client. A configuration and asset management tool is also included in the operations architecture for managing a plurality of predetermined assets connected with said netcentric computing system. These assets could be servers, clients, printers, and various other computing devices that are connected with the netcentric computing system.

A fault management and recovery management tool is also provided in the preferred operations architecture for assisting in the diagnosis and correction of a plurality of system faults in said netcentric computing system. Those skilled in the art would recognize that several system faults may occur in the netcentric computing system and that the preferred fault management and recovery tool is able to deal with and correct these system faults.

In addition, the preferred operations architecture also includes a capacity planning tool that monitors a plurality of predetermined system usage levels in the netcentric computing system. The system usage levels may be selected from, but are not limited to, the group consisting of server processing usage, server bandwidth usage, server storage usage and client usage. A performance management tool is also included in the operations architecture for monitoring the performance of applications running on the netcentric computing system. A license management tool of the operations architecture manages and controls software license information for applications running on the netcentric computing system.

The preferred operations architecture also includes a remote management tool that allows support personnel from the netcentric computing system to take control of the client if required. This allows support personnel from to diagnose and repair problems with the client if they occur during operation. An event management tool of the operations architecture handles a plurality of predetermined events in the netcentric computing system. The predetermined events the event management tool are designed to handle include a broad category of events, including, but not limited to disk space indications, central processing unit utilization, database error indications, network error indications, application error indications and file and print service indications.

A systems monitoring and tuning tool is also provided by the preferred operations architecture for monitoring applications and computing devices connected with the netcentric computing system. The preferred monitoring and tuning tools are capable of monitoring applications, middleware, databases, networks, clients and servers and the tuning tools are capable tuning applications and dealing with network capacity issues. The preferred operations architecture also includes a security tool that includes a security application that provides security to the resources of the netcentric computing system. A user administration tool is also provided in the preferred operations architecture for administering users of the netcentric computing system. Administering users includes such tasks as adding new users, deleting users, setting up access rights for users and removing access rights for users, to name just a few.

A production control application set for scheduling and handling a plurality of production processes on said netcentric computing system. In the preferred embodiment, the production control application set may be selected from the group consisting of a print management tool, a file transfer and control tool, a mass storage management tool, a backup and restore tool, an archiving tool and a system startup and recovery tool. A help desk tool is also part of the preferred operations architecture and includes a help application that provides users of applications on the netcentric computing system with assistance during times of need.

Further objects and advantages of the present invention will be apparent from the following description, reference being made to the accompanying drawings wherein preferred embodiments of the present invention are clearly shown.

DETAILED DESCRIPTION OF THE PRESENTLY PREFERRED EMBODIMENTS OF THE INVENTION

Figure 1:
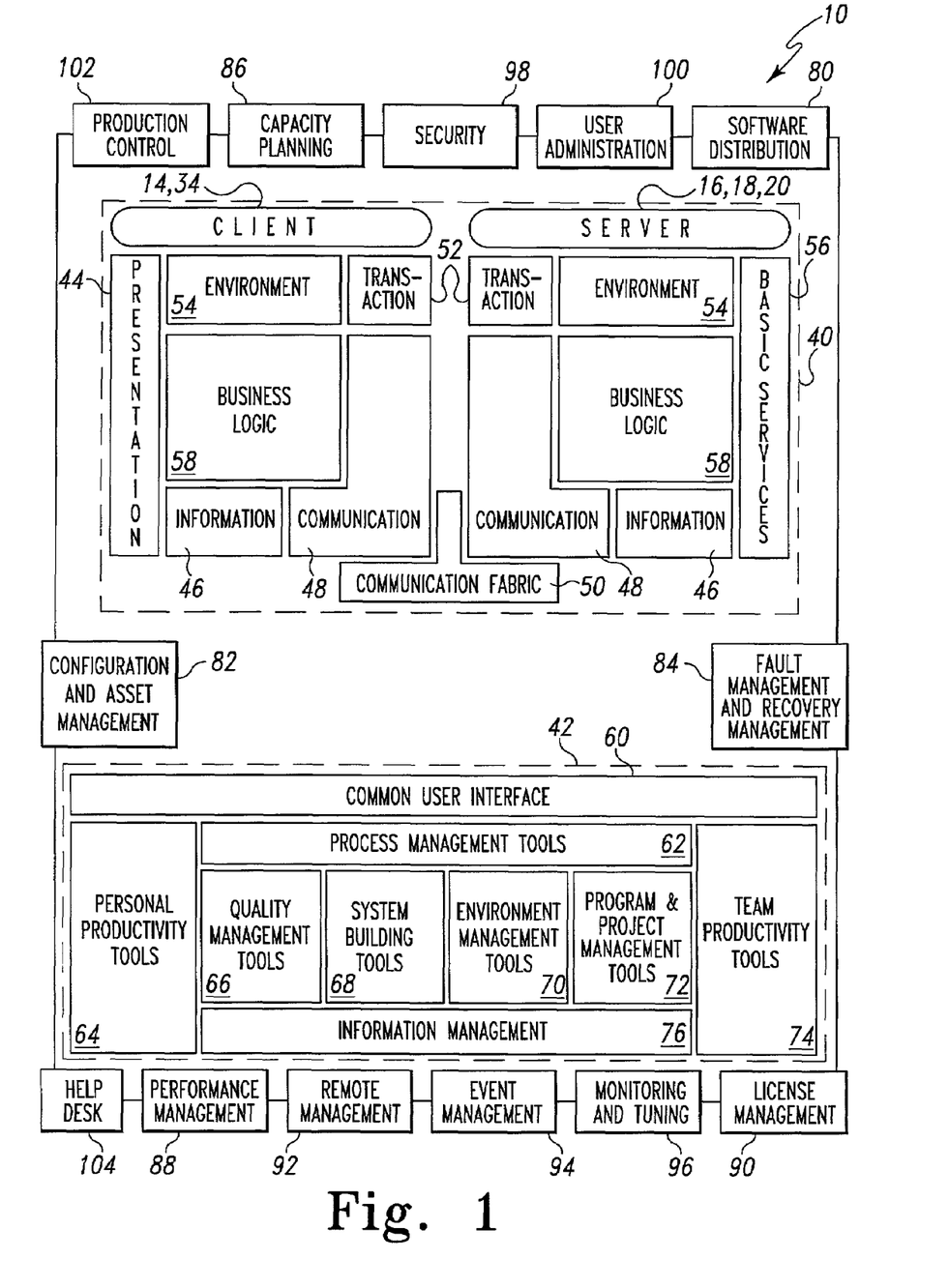
FIG. 1 illustrates operations architecture for a netcentric computing system.
Figure 2:
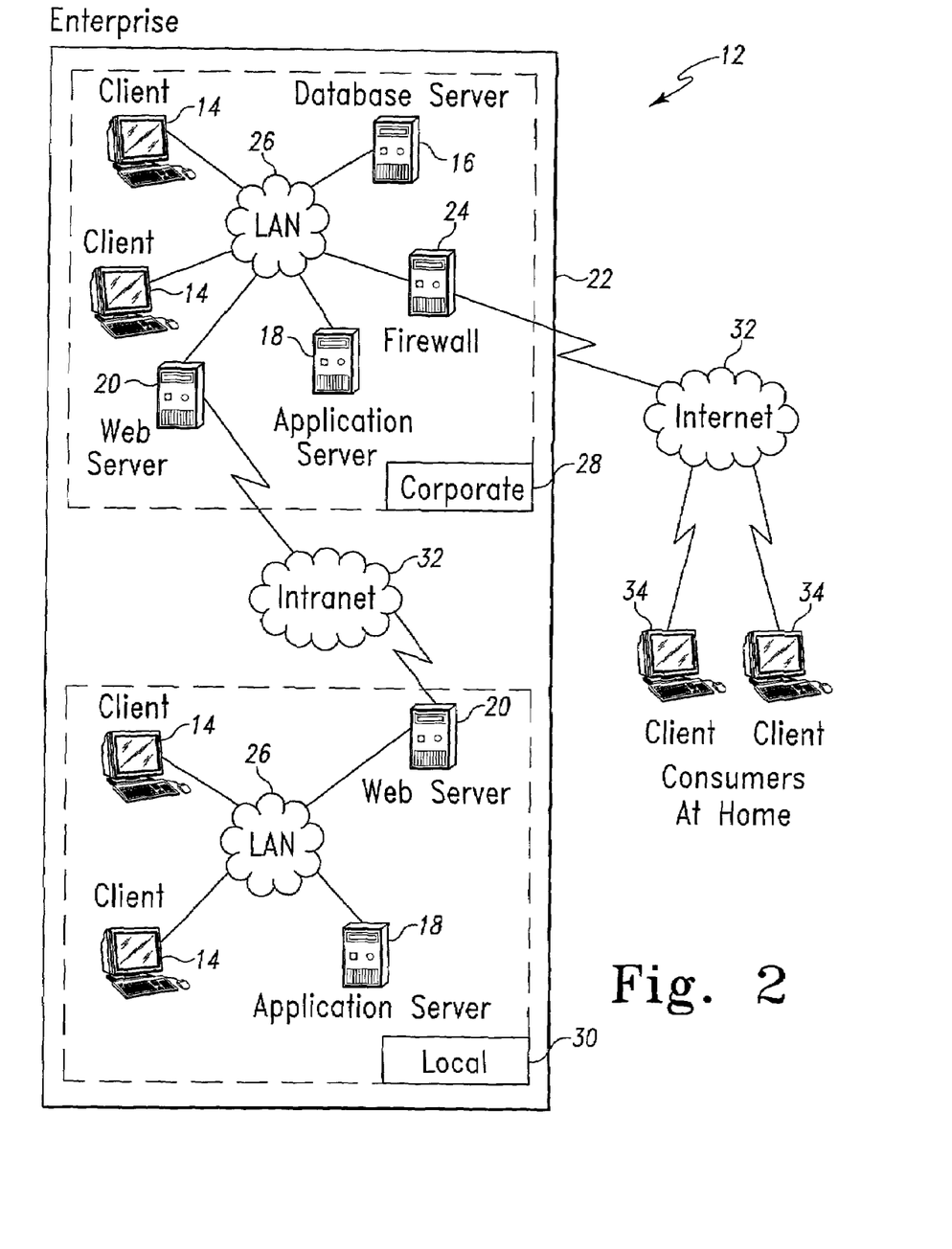
FIG. 2 illustrates a representative netcentric computing system.

Referring to FIGS. 1 and 2, the present invention discloses an operations architecture 10 for a netcentric computing system 12. The preferred netcentric computing system 12 includes at least one client 14 that is connected, via a network connection, with at least one server 16, 18, 20. The operations architecture 10 is located on the servers 16, 18, 20 and is used by the servers 16, 18, 20 during operation of the netcentric computing system 12, as set forth in greater detail below. Referring to FIG. 2, the physical picture of an illustrative netcentric computing system 12 is illustrated. In this example, a business enterprise 22 includes at least one client 14, at least one database server 16, at least one firewall 24, at least one application server 18, at least one web server 20 and a local area network (LAN) connection 26, which are electrically connected as illustrated in FIG. 2.

As generally known in the art, LAN connections 26 are comprised of networking software applications and various computing devices (network cards, cables, hubs, routers, etc.) that are used to interconnect various computing devices (i.e.—clients 14 and servers 16, 18, 20) that are located at a first business enterprise location 28o form a network at that location. The term LAN connection 26 as used herein, should be broadly construed to include any and all hardware and software applications that allows clients 14, servers 16, 18, 20, or other computing devices to be electrically connected together to share and transfer data. Although not illustrated, other devices such as printers may be connected with the LAN connection 26 so that the resource is available to users of the network. Those skilled in the art would recognize that various types of LAN connections 26 exist and may be used in the present invention.

For the purpose of the present invention, the firewall 24 is used to isolate internal systems from unwanted intruders. In particular, firewalls 24 isolate web servers 20 from all Internet traffic that is not relevant to the netcentric computing system 12. In the preferred embodiment, the only requests allowed through the firewall 24 are for services located on the web servers 20. All requests for other applications (e.g., FTP, Telnet) and other IP addresses that the netcentric computing system 12 receives are typically blocked by the firewall 24 during operation of the netcentric computing system 12.

The web servers 20 are the primary interface to the clients 14 for all interactions with the applications or services that are provided by the netcentric computing system 12. The main task of the web servers 20 is to authenticate the clients 14, establish a secure connection from the clients 14 to the web servers 20 using encrypted messages, and allow applications the clients 14 are using to transparently access the resources of the netcentric computing system 12. The web servers 20 are responsible for accepting incoming HTTP (Hypertext Transfer Protocol) messages and fulfilling the requests. For dynamic HTML (Hypertext Markup Language) page generation, requests are forwarded to the application servers 18. During operation, static pages, such as help pages, are preferably generated entirely by the web servers 20.

In the preferred embodiment, the primary function of the application servers 18 is to provide a link through which the web servers 20 can interact with the clients 14, trigger business transactions, and send back resulting data to the clients 14. A fundamental role of the application servers 18 is to manage the logical flow of transactions and keep track of the state of sessions. The application servers 18 are also responsible for managing all sessions within the netcentric computing system 12. A session is a period of time in which a client 14 is interacting with, and using, a resource of the netcentric computing system 12.

In the preferred embodiment of the present invention, the main purpose of the database servers 16 is to handle an application log. All requests sent to the web servers 20 and application servers 18, as well as their respective responses, are logged in the application log. The application log is preferentially used for traceability. In the preferred embodiment, requests are logged in the application log directly by the application server 18. Those skilled in the art would recognize that any number of data items can be monitored and kept track of in the application log.

As further illustrated in FIG. 2, a second business enterprise location 30 may be connected with the first business enterprise location 28 using an intranet connection 32. Those skilled in the art would recognize that various intranet connections 32 exist and may be used in the present invention. The intranet connection 32 allows the computing resources of the second business enterprise location 30 to be shared or connected with the computing resources available at the first business enterprise location 28. The term intranet connection 32, as used herein, should be broadly construed to include communication devices and software applications as well as various other connection devices used to physically interconnect two or more business networks. Although not illustrated, several other enterprise locations, each containing its own computing resources, may be connected with the netcentric computing system 12 using other intranet connections 32.

In the preferred embodiment illustrated in FIG. 2, the firewall 24 of the first business enterprise location 28 is connected with an Internet connection 32 to a plurality of remote clients 34. The remote clients 34 that are connected to the Internet connection 32 preferentially access data and communicate with the services of the netcentric computing system 12 through the Internet connection 32 using web browser applications that are located and running on the clients 34. The Internet connection 32 gives the remote clients 34 the ability to gain access to applications, information and data content that may be located on the database server 16, the application server 18 and the web server 20, preferably by means of the web server 20.

As used herein, the term Internet connection 32 should be broadly construed to include any software application and hardware device that is used to connect the clients 34 and the servers 16, 18, 20 with an Internet service provider (not illustrated) that establishes the connection to the Internet. Those skilled in the art would recognize that the clients 34 and the servers 16, 18, 20 may establish the Internet connection 32 with the Internet service provider using modems, cable modems, ISDN connections and devices, DSL connections and devices, fiber optic connections and devices, and satellite connections and devices to name a few. For the purpose of the present invention, it is important to understand that the remote clients 34 and servers 16, 18, 20 are connected with one another through the Internet connection 32.

For a detailed discussion of the elements of the technical architecture of the preferred netcentric computing system 12, as well as netcentric computing systems 12, refer to co-pending U.S. patent application Ser. No. 09/676,227 entitled Architectures For Netcentric Computing Systems, which was filed on Sep. 29, 2000 and is hereby incorporated by reference in its entirety.

Referring to FIG. 1, the operations architecture 10 includes the tools and support services required to keep a production system up and running well in a netcentric computing system 12. The preferred operations architecture 10 supports a netcentric execution architecture 40 and a development architecture 42 that are located on the netcentric computing system 12. It differs from the execution architecture 40 and the development architecture 42 in that the operations architecture's 10 primary users are systems administrators and production support personnel. In addition, it differs from the operations infrastructure in that the operations infrastructure represents operations processes and organization as well as the technologies and tools.

The netcentric execution architecture 40 includes common run-time services that are required when an application executes on the netcentric computing system 12. The preferred netcentric execution architecture includes presentation services 44, information services 46, communication services 48, communication fabric services 50, transaction services 52, environment services 54, base services 56, and business logic services 58. For a detailed discussion of each of the services set forth above, as well as the role they plan in the preferred netcentric computing system 12, refer to co-pending U.S. patent application Ser. No. 09/676,227 entitled ARCHITECTURES FOR NETCENTRIC COMPUTING SYSTEMS.

The development architecture 42 is used to create the applications that perform business processes in the netcentric execution architecture 40 of the netcentric computing system 12. The purpose of the development architecture 34 is to support the tasks involved in the analysis, design, construction and maintenance of business systems and applications, as well as the associated management processes of the netcentric computing system 12. The preferred development architecture 42 includes common user interface tools 60, process management tools 62, personal productivity tools 64, quality management tools 66, system building tools 68, environment management tools 70, program and project management tools 72, team productivity tools 74, and information management tools 76. For a detailed discussion of the preferred development architecture 42, refer to co-pending U.S. patent application Ser. No. 09/677,065 entitled DEVELOPMENT ARCHITECTURES FOR NETCENTRIC COMPUTING SYSTEMS, which is incorporated herein by reference in its entirety.

As illustrated in FIG. 1, the preferred operations architecture includes a wide variety of tool categories. Tool categories cover the spectrum of functions provided by the operations architecture 10, which range from software distribution tools to help desk tools, as set forth in more detail below. The preferred operations tools in the operations architecture 10 include a software distribution tool 80, a configuration and asset management tool 82, a fault management and recovery management tool 84, a capacity planning tool 86, a performance management tool 88, a license management tool 90, a remote management tool 92, a event management tool 94, a systems monitoring and tuning tool 96, a security tool 98, a user administration tool 100, a production control application set 102 and a help desk tool 104.

The tools set forth above provide visibility and control over the events of a distributed environment, which is how netcentric computing system 12 operates. In essence, they can be viewed as the support and control mechanisms for both the netcentric execution architecture 40 and the development architectures 42. This relationship is illustrated in FIG. 1, where the major categories of operations tools are depicted as supporting the netcentric execution architectures 40 and the development architectures 42.

In the preferred embodiment, the software distribution tools 80 provide automated delivery to, and installation of, applications and systems software on the servers 16, 18, 20 and end user devices (e.g., clients 14, 34, kiosks, etc.). This can be for an organization's internal computing environment, as well as for its extended one, i.e., its business partners and customers. The architectural support required to support the operations architecture 10 software distribution is largely driven by the number of clients 14, 34, servers 16, 18, 20, and the geographic locations to be served.

When it is unrealistic to use a manual approach to software distribution, an organization should consider adding automated software distribution tools 80 to the operations architecture 10. Many products from leading vendors such as Microsoft, Tivoli, and Hewlett-Packard are on the market today that include or specialize in automated software distribution. Systems developers must look for several important features, depending on the specific support requirements of the netcentric computing system 12.

The server 16, 18, 20 component of a preferred software distribution tool 80 enables administrators to build distribution packages and to control distribution amongst the netcentric computing system 12. A distribution is a package of related software files, data, and installation scripts that form an installable unit. Few significant application installations, systems software installations, or even upgrades can be achieved simply by sending a single file. Configuration files (e.g., config.sys) and system files (e.g., autoexec.bat, login as well as multiple software files for a particular application or systems software component, often require changes. In addition, it is usually desirable to upgrade multiple applications or combinations of systems software and applications in a single distribution rather than performing multiple independent software distributions. Bundling software upgrades together also reduces the amount of release testing required.

A distribution is created by selecting the files and scripts, often through a point-and-click interface on the clients 14, 34 or servers 16, 18, 20, depending on what system is being upgraded. The components are then combined into a single file for transmission to the respective devices. Some software distribution tools 80 might provide compression capabilities to reduce the physical size of the distribution. This is particularly important in a WAN environment where line speeds are an issue.

There are multiple approaches to scheduling software distributions. Some solutions use a rigid scheduling mechanism that requires all target machines (i.e., clients 14, 34 or servers 16, 18, 20) to be powered on at a specified time when the software distribution is to occur. This mechanism could be characterized as a "push" strategy, where the server 16, 187, 20 performing the software distribution pushes the application to the clients 14, 34 or servers 16, 18, 20 at a specified time.

A more flexible approach is a pull strategy, where the clients 14, 34 or servers 16, 18, 20 check for software updates and pull the software from the designated servers 16, 18, 20 at log-in time. Thus, when the user signs on either in the morning or at some point during the day, any pending updates are downloaded to the respective clients 14, 34 or servers 16, 18, 20. When combined with a forced log-off capability, which most networks support, this can effectively mimic the push strategy without the attending problem of some machines being powered off Neither the push nor pull scheduling approach is sufficient when large numbers of target clients 14, 34 are involved. For example, a sales office automation system developed several years ago and used by 1,400 salespeople distributed across scores of locations encountered a problem with these strategies on its first major software upgrade. The sales office used the pull strategy because it was not feasible to have all workstations, locations, and dialup users connected and powered up at the same time. The distribution was scheduled to be available when the users logged in on Monday morning. This was a substantial functional upgrade to the system, so the software distribution was several megabytes in size. The problem was that 1,400 machines could not simultaneously download one copy of software off of a server. As a result, most users were unable to retrieve the new software or use the system for several days.

Faced with the problem of scale, two alternatives can be used when performing a software distribution on a large scale. One is simply to acquire more servers 16, 18, 20 with more copies of the software to be distributed. Of course, this is an expensive solution, particularly when these machines are not needed for any other purpose. The preferred solution provided by the software distribution tools 80 involves staging software distribution. Software distribution staging works by sending a new version of the software in advance of the cut-over date. In effect, the clients 14, 34 or servers 16, 18, 20 have two versions of the application physically resident simultaneously, but only one is in use. The existing software is used until the present cut-over date is reached. At that time, the client 14, 34 portion of the software distribution tool 80 automatically completes the installation and redirects the user to the new version. Using this approach, it is possible to selectively download the software update to subsets of machines well in advance of the cut-over date, thus eliminating the bottleneck.

An enhancement of staging is the ability to cut over to the new version on the receipt of a small command file rather than a preset date. This gives operations more flexibility to alter the cut-over date due to unanticipated events. For example, many adopters fail to anticipate the requirements of having multiple copies of applications stored simultaneously when determining the size of the workstation hard disks required for the users.

Remote Installation

Most software distribution tools 80 used in the operations architecture 10 include a client 14, 34 portion as well as a server 16, 18, 20 portion that resides on the target machine. The client 14, 34 software is responsible for installation of the software distribution onto the target machine's hard disk. The first step in the installation process is the unbundling (and uncompressing) of the software distribution into the component files, data sets, and scripts (although the better products will first check to see that the required disk space is in fact available). Next, any pre-installation scripts are executed. These scripts may do such various tasks as checking for required components or adding or modifying lines in the target machine configuration or systems files that will be required by the new software (e.g., changing the number of buffers or adding a line to install a necessary driver at startup time). The directories in which the software is to reside are checked or created, and then the actual software files are moved into the proper location on the hard disk. At this point a post-installation script may be invoked that could include rebooting the machine so that the changes to the system and configuration files can take effect.

In large netcentric computing system 12, where tens or even hundreds of servers 16, 18, 20 support individual groups of clients 14, 34, a cascaded software distribution approach may be used. A cascaded software distribution allows for a central administrator to schedule the distribution of software updates to designated servers 16, 18, 20 within the netcentric computing system 12. These servers 16, 18, 20 in turn, distribute the software updates to their associated clients 14, 34. This approach allows the simple push and pull strategies to be used for larger numbers of clients 14, 34 without requiring staging. It also better utilizes the servers 16, 18, 20 and communications links in these larger environments.

Another aspect of the software distribution tool 80 is that it supports error handling reporting. When dealing with larger networks of clients 14, 34, errors inevitably occur in the software distribution process. There may be insufficient disk space or a required component may be missing. The preferred software distribution tool 80 is capable of reporting errors and taking appropriate actions. Error reporting normally takes the form of a distribution log file that records success, failure, or errors encountered. In some cases a more active form of error reporting may be required, where email messages may be automatically generated and sent to either the administrator or, in some cases, the affected clients 14, 34. If a fatal error is detected, the software distribution tool 80 will reverse any changes made to that point and restore the clients' 14, 34 machines to their previous state.

As illustrated in FIG. 1, the preferred operations architecture 10 includes configuration and asset management tools 82. To manage a netcentric computing system 12, one must have a solid understanding of what is located where, and one must maintain rigor in the change control procedures that govern modifications to the netcentric computing system 12. Configuration and asset management information that the configuration and assent management tools track includes such details as product licensing information, warranty information, vendor names, logical and physical device information (such as total capacity and current utilization), product configuration tracking, software and data version levels, network configuration parameters, physical location, and perhaps accounting information.

In larger netcentric computing systems 12 an underlying configuration and asset management database is used to keep track of configuration and asset information in the netcentric computing system 12. This database becomes a key information source for those managing, maintaining, and adding to the netcentric computing system 12. Automatic asset and configuration collection capability is included in many vendor solutions, including OpenView from Hewlett-Packard (HP), and POLYCENTER Systems Census from Digital Equipment Corp. These products can be wed to interrogate the netcentric computing system 12 and discover network and computing devices, and collect related information about these devices. In addition, these products can perform the needed periodic auditing to detect changes to the environment over time—for example, when a client 14, 34 moves a machine or installs a network game. Those skilled in the art would recognize that various configuration and asset information may be collected and stored about the resources using the netcentric computing system 12.

Another important and related feature that is provided by the configuration and asset management tools 82 is the ability to restore a machine (i.e., clients 14, 34 or servers 16, 18, 20) to a known or initial configuration for problem resolution. The configuration and asset management tools 82 provide facilities for determining the correct initial state for a given machine or network device and initiates any software distribution or configuration changes needed to bring the device back within compliance. For more dynamic netcentric computing systems 12, where machine and network configurations are changing frequently, it is even more important to have an active configuration and asset management system. The capability to automatically change configurations of a large number of machines and network components or even to roll back to previous configuration settings for any particular device becomes increasingly important and is provided by the preferred configuration and asset management tools 82.

A well-functioning configuration and asset management tool 82 becomes a vital information source for conducting impact analysis for any requested changes to the netcentric computing system 12. The frequency with which unexpected negative side effects are caused by relatively minor configuration changes to the netcentric computing system 12 has been an embarrassing and frustrating surprise for many adopters of the technology.

Much of the source of these problems relates to the high number of execution architecture components and complex interdependencies between them. Another problem is the reality that most netcentric computing systems 12 involve numerous independent vendors. Changing even the release level of one systems software component may have a ripple effect and may require updates to, or newer versions of, additional software components or applications.

To support this type of impact analysis, dependency information is maintained by the configuration and asset management tools 82. For example, version X of the Oracle database management system requires version Y or greater of the HP-UX operating system and version Z of yet another vendor's Transmission Control Protocol/Internet Protocol product to function properly. It is not uncommon for a user organization to wish to return to a previous operating system release to acquire an application package that does not yet support the latest operating system version. The configuration and asset management tools 82 maintain relationship information so that it is not purely guesswork if in fact the proposed version change will break any required dependencies of the netcentric computing system 12.

The configuration and asset management tools 82 also enforce the appropriate degree of standardization across network environments in the netcentric computing system 12. For large netcentric computing systems 12, where thousands of clients 14, 34 are involved, it is not feasible to effectively manage the environment if each client 14, 34 has its own unique configuration and combination of software products. On the other hand, it is not typically appropriate to give thousands of users the exact same configuration if the users perform different functions within the organization. For example, users in such diverse areas as sales, product development, and human resources are likely to require different computing capabilities. The goal is to strike the correct balance between standardization, which simplifies the required operations architecture and tasks, and accommodation to each business area's unique computing needs.

Referring to FIG. 1, the preferred operations architecture 10 includes fault management and recovery management tools 84. Failure control is important in a netcentric computing system 12. The presence of heterogeneous equipment, however, makes it difficult to determine the origins of a fault. Multiple messages may be generated within the system from a single fault, making it difficult to separate the fault's cause from its effects.

The fault management services and recovery management tools 84 of the operations architecture 10 assist in the diagnosis and correction of system faults in the netcentric computing system 12. Faults may include network-, server-16, 18, 20, client-14, 34, or even application-level faults. Fault diagnosis requires services for isolation; viewing of host, server 16, 18, 20, and client 14, 34 error logs; and determining the software and data versions and configurations of affected machines.

The fault management and recovery management tools 84 also include network management and diagnostic tools for monitoring and reporting on network traffic and failures on the netcentric computing system 12. Additional diagnostic tools such as protocol analyzers may also be included to determine the true source of the problem.

Another factor to consider in this selection is the choice between integrated operations environments (typified by HP's OpenView or CA-Unicenter TNG), and point solutions that provide only one function. Although most integrated tool sets today do not adequately address the full breadth of fault management and diagnostic requirements, they can reduce the number of vendors and the complexity of integrating these point solutions.

Recovery capabilities are also included in the fault management and recovery management tools 84. Recovery capabilities span the range from those required to bring up a client 14, 34 or server 16, 18, 20 after it has failed to those required in the event of a major disaster. With critical business applications being rolled out on distributed technologies, the recovery of these systems must be easy, quick, and efficient. Loss of the netcentric computing system 12 for even a short period can result in significant financial losses to the business.

A wide variety of recovery tools may be required for fault recovery. These range from strictly network-oriented components (for restoring links or reconfiguring components) to more systems-level components (for restarting processes on machines or restoring databases). More involved tasks, such as the distribution of software fixes to clients 14, 34 or servers 16, 18, 20, may require the ability to remotely reboot and reinitialize machines, printers, or other network components. Those skilled in the art would recognize that the application of the preferred fault management and recovery management tools 84 will vary, depending on the needs and requirements placed on the netcentric computing system 12.

As illustrated in FIG. 1, the preferred operations architecture 10 includes capacity planning tools 86. The capacity planning tools 86 focus on individual components of an environment such as the network, physical space, and processing power to understand the need to change the capacity of those components based on organizational changes. The capacity planning tools 86 preferentially include applications that monitor a plurality of predetermined system usage levels in the netcentric computing system 12.

The system usage levels are preferentially selected from the group consisting of server processing usage, server bandwidth usage, server storage usage and client usage. The server processing usage information relates to the processing power being consumed by servers 16, 18, 20 during operation. The server bandwidth usage information relates to the amount of Internet traffic that is taking place over the Internet connection 32 with the servers 16, 18, 20 of the netcentric computing system 12. The server storage information relates to the amount of drive space available and being used on the servers 16, 18, 20 of the netcentric computing system 12. The client usage information relates to various items that can be stored about a respective clients 14, 34 session with the netcentric computing system 12.

The capacity planning tools 86 typically focus on components that are considered to be heavily sensitive to changes in computing resource usage. The preferred capacity planning tools 86 may use historical management data combined with estimates for growth or changes to configuration to simulate the ability of different system configurations to meet capacity needs. Capacity planning tools 86 can sometimes be integrated into a larger integration platform, or they can be standalone applications, depending on the needs and requirements of the netcentric computing system 12.

As previously set forth, referring to FIG. 1, the preferred operations architecture 10 includes performance management tools 88. The performance management tools 88 include applications that monitor the performance of computing resources and netcentric applications that are running on the netcentric computing system 12. Performance tuning issues are no longer confined to the network or to central processing units in netcentric computing systems 12. Performance tuning needs to be viewed in an end-to-end manner, accounting for all the factors that affect the performance of the netcentric computing system 12 relative to a user request from a respective client 14, 34. Those skilled in the art would recognize that the particular design of applications used in the performance management tools 88 will vary depending on the needs and requirements of the netcentric computing system 12.

The creation of a customer order, for instance, may involve multiple server 16, 18, 20 accesses for data and information to be exchanged between the client 14, 34 and the host server 16, 18, 20. The performance relative to the entire business event needs to be considered, not simply the performance of a single component involved. As such, the performance management tools 88 include applications that surround processes occurring on the netcentric computing system 12 that monitor the performance of devices (i.e., clients 14, 34; server 16, 18, 20) to calculate and provide end-to-end performance information.

The preferred operations architecture 10 for the netcentric computing system 12 also includes license management tools 90. The license management tools 90 include applications that focus on guaranteeing compliance with software license agreements for various vendor applications that are used on the netcentric computing system 12. Since the advent of computer networks that allow applications to be shipped and installed around the network as required, the issue of license management has become increasingly important. Application vendors have been experimenting with various licensing strategies, including unrestricted site licenses, fixed concurrent user licenses, and floating licenses that actually enforce the restriction on concurrent users.

Independent of these actions by software vendors, large organizations struggle to keep a handle on exactly what software products they own and how many copies they own. They have also been working to ensure that they are in compliance with software licensing agreements while not paying for more copies of software than they truly require. As such, the licensing management tools 90 allow administrators to monitor and track applications that have licensing requirements to ensure compliance with the terms of each respective agreement.

In addition to guaranteeing compliance with software licensing agreements, the preferred license management tools 90 are capable of providing license report detailing which clients 14, 34 and how many clients 14, 34 are actually using a given software application. If, in fact, the license report indicates that the organization has over-purchased, it may be possible to realize some savings by reducing software licensing agreements, or vice versa. Those skilled in the art would recognize that several applications may be provided in the license management tools 90 to ensure license agreement compliance, depending on the particular applications provided in the netcentric computing system 12.

As distributed environments allow users more flexibility in terms of where they work, the ability of a centralized support group to effectively manage remote clients 34 has become important. Visibility to the configuration of a respective remote client 34 is only possible by physically sitting at the workstation and diagnosing problems or by accomplishing the same remotely.

As illustrated in FIG. 1, the preferred operations architecture 10 also includes remote management tools 92. The remote management tools 92 allow support personnel to "control" a user's desktop over the netcentric computing system 12 so that the support personnel do not need to be physically present at a particular client 14, 34 to diagnose problems. Once control of the desktop on the client 14, 34 is established by the remote management tools 92, screen updates for the controlled desktop are displayed at both locations. The support person will typically be located at another client 14, 34 that is connected with the netcentric computing system 12. The support person is then effectively sitting at the client 14, 34 he/she controls and can do necessary diagnostics.

In addition to problem diagnosis, the remote management tools 92 provide visual explanations to user questions. For example, if a user has a question about a certain application feature, the support person may remotely control the user's desktop, then walk through the solution while actions are displayed on the screen of the client 14, 34.

The preferred remote management tools 92 are also useful in organizations where 24×7 support is required. Rather than requiring support personnel to be physically present for all events, they may be able to dial in through the remote management tools 92 from home and accomplish the same tasks. The ability to perform these tasks remotely can have positive effects on overall support costs through a reduction in the amount of time needed to resolve problems. Remote management tools may come bundled with an integration platform such as HP Open View or Tivoli TME, or they may be purchased as third-party software packages or designed specifically for the netcentric computing system 12.

The preferred operations architecture 10 also includes event management tools 94. The event management tools 94 include applications that manage a plurality of predetermined events generated by applications or devices on the netcentric computing system 12. The predetermined events may relate to disk space indications, central processing unit utilization indications, database error indications, network error indications, application error indications and file and print service indications. Those skilled in the art would recognize that other predetermined events could be monitored depending on the needs of the respective netcentric computing system 12.

In addition to hardware devices, applications and systems software generate events on the netcentric computing system 12. Common event-handling applications are used to provide information to management in a simple, consistent format and to forward on important events for management purposes. Those skilled in the art would recognize that events the event management tools 94 are design to monitor will vary. The applications that are designed for the preferred event management tools 94 preferentially monitor a plurality of predetermined events that might occur in various applications on the netcentric computing system 12.

The preferred operations architecture 10 also includes systems monitoring and tuning tools 96. The number of devices and the geographic disparity of devices used in a netcentric computing system 12 increase the effort required to monitor the system. The number of events generated in the netcentric computing system 12 rises due to the increased complexity. Devices such as clients 14, 34, network components (software and hardware), and servers 16, 18, 20 generate events on startup or failure to periodically report device status. The application used in the systems monitoring and tuning tools 96 are designed to detect and record predetermined events that occur on the clients 14, 34 or servers 16, 18, 20. The predetermined events may be from applications, databases, networks, clients 14, 34, servers 16, 18, 20. Those skilled in the art would recognize that the term event should be broadly construed to cover any event that can be monitored and recorded in the netcentric computing system 12.

The security tools 98 include applications that implement a predetermined security policy on the netcentric computing system 12. As illustrated in FIG. 1, the operations architecture 10 also include security tools 98. A security policy is the set of rules, directives, and practices that regulate how an organization manages, protects, and distributes sensitive information on the netcentric computing system 10. A security policy is translated into access control rules that are enforced by the security tools 98.

The preferred security tools 98 of the operations architecture 10 include identification tools and authentication tools. The identification tools are used to provide an identifier for users of the netcentric computing system 12. An identifier is a piece of data used to uniquely identify an entity in a transaction. The identifiers are unique and associate the entity with the identifier. The identifiers are issued to entities during part of a registration process that validates an entity's request to participate in a system, generates a unique identifier, binds that identifier to the requesting entity, and distributes the identifier to the now participant entity.

Once participating entities have been registered, the authentication tools validate the identifier during a transaction. Authentication applications validate that the entity requesting access to the resources of the netcentric computing system 12, whether that is a human or automated process, is the true owner of that identity. Authentication can be performed by three primary methods: by validating what the user/entity knows, what they have, or what they are. For instance, validating by what the user identity knows may be done by using secret passwords, PIN numbers, credit card numbers or mother's maiden name. Validating by what the user has can be done using an ATM card, credit card, smart card or a private key stored on an encrypted file on the client 14, 34. Validating by what the user is can be done using various biometric verification means such as voice prints, iris scan, signature verification and thumb scan.

The preferred security tools 98 provide access control to the netcentric computing system 12. Once the identity has been established, access control rules determine what resources the entity may use. Access control is used to permit or deny a specific type of use system resources on the netcentric computing system 12. For example, a user may be authorized to access a resource, but only for reading. Access control can be used to arbitrate access to files, processes, operating system ports, application functions, database tables, portions of a network (such as through virtual or dedicated circuits and firewalls), and other types of resources. This is preferentially accomplished through the use of Access Control Lists (ACLs) in the netcentric computing system 12. An ACL for a resource specifies the user or group and the type of access permitted (read, write, etc.). ACLs may optionally include date and time restrictions and program restrictions.

Another way the security tools 98 can provide access to the netcentric computing system 12 may be through the use of role based access control. Role based access control associates a job function/role to a set of resources on the netcentric computing system 12, and then assigns the user to a particular role. So, for example, the role of junior bookkeeper may have read and write access to the petty case account, but read-only access to the general ledger. The advantage of role based access control is that it facilitates the management of access control and prevents users from retaining access to data that is no longer needed as they move from role to role.

Resource access control may be either restrictive or permissive in the netcentric computing system 12. Restrictive resource access control is based on the policy that whatever is not explicitly prohibited is allowed. Each of these methods has a use, depending on the requirements of the netcentric computing system 12. For network and firewalls 24, restrictive access control is commonly used. For most servers, 16, 18, 20, permissive access control is the norm. Those skilled in the art would recognize that variations exist on the exact manner in which access control is provided and are envisioned.

The preferred security tools 98 also include auditing tools. Auditing tools are used to record accesses to resources on the netcentric computing system 12, and may be implemented at a number of layers, including operating system, database, application, middleware, as well as in network devices such as firewalls 24 and routers. Auditing is typically implemented in combination of these layers to allow reconstruction of events after a security problem is detected. The logs kept by the auditing tools are preferentially searchable for known or suspected patterns of abuse, and are protected from alteration. Logs can monitor a variety of data, including access times, user Ids, locations, actions the user performed, and whether or not those actions were successfully completed.

The preferred security tools 98 may also include integrity tools. Integrity refers to the property that any system must have if it is to protect itself and enforce its security policy. During operation, the integrity tools protect the netcentric computing system 12 from buffer overflows, faulty parameters, or attacks on improperly-configured network ports have failed to meet the integrity requirement. The integrity tools also protect the netcentric computing system 12 from viruses. Viruses constitute what is probably the best known attack on integrity in a netcentric computing system 12.

The preferred security services 98 also includes cryptographic tools. Public key cryptography is one of the most important enabling technologies in the netcentric environment. The cryptographic tools ensure that messages are accessible only by those properly authorized, even when they traverse insecure networks. The term "message" broadly refers to an e-mail dispatch, or the more dynamic transactions of web sessions between clients 14, 34 and the web server 20. The cryptographic tools also ensure that a message is actually sent by the purported sender. Further, the cryptographic tools check for integrity to provide assurance that the message has not been modified in transit and also ensures that a sender cannot disavow a message.

The preferred cryptic tools use keys to encrypt communications. There are two types of keys used in the preferred netcentric computing system 12. A secret key is one type of key that is used and a key that is shared between two entities in a transaction. Because the same key is used to encrypt and decrypt data, this is referred to as symmetric key encryption. In order for the parties to communicate, they must establish the secret key in advance, using a secure channel. The most common implementation of a symmetric key algorithm is the Data Encryption Standard (DES). A public/private key pair or asymmetric key is the second type of key that is used and uses a pair of keys to encrypt and decrypt messages. Messages encrypted using one of the keys can only be decrypted with the other key. Each party possesses a pair of keys, one public key accessible to all participants in the system, and one private key accessible only to the party that owns it. The most common implementations of public key algorithms are supplied by RSA Data Security, Inc. In the most basic implementations, data is encrypted by the sender (i.e., client 14, 34 or server 16, 18, 20) with the public key of the recipient (i.e., client 14, 34 or server 16, 18, 20) and decrypted by the recipient with their private key.

Although public key cryptosystems do not require users to share a common secret key, key management is still a serious problem. Public key systems require a binding between a specific public/private key pair and an entity that is participating in the system. When using a public key to protect information destined for a specific entity, the user assumes that the public key he or she uses is really the one belonging to the entity. As such, in the preferred embodiment of the invention this binding is assured through the use of a trusted third party (TTP), called a Certificate of Authority, or CA.

Recall that the method for transmitting a message using public key cryptography is to encrypt the message with the receiver's public key. The benefit is that a user's public keys can be sent as clear text, or even published in a directory. So, if Alice wants to send a message to Bob, but is tricked into using Eve's public key, then Even will be able to intercept the message. (Eve can then, if she chooses, re-encrypt the message using Bob's actual public key, and neither Alice nor Bob will be the wiser.) In a netcentric computing system 12, which is in effect a global network lacking face-to-face contact, users must be assured they are using the right key. The CA provides this in the preferred netcentric computing system 12.

The CA serves a function analogous to that of a passport or drivers license in the netcentric computing system 12. The CA binds public keys to users and services similar to the way a passport agency issues you a passport that ties your name and relevant personal information to you with a picture. CAs deliver public keys through the use of certificates which are preferentially compliant with the X.509 standard. The CA will publish information to a directory, which contains an entry for each entity with a certificate.

Public key cryptosystems provide transaction authentication through the use of digital signatures. Digital signatures are created by the application of a has function to a piece of data (e.g., a message). This message hash is then encrypted with a sender's private key. The message recipient can use the sender's public key to decrypt the message hash, and rerun the hashing algorithm to make sure the hash has not changed. If the two hashes match, the sender has been properly authenticated. Note that for authentication, the pattern of public/private key use is the reverse of that for confidentiality. For confidentiality, the sender encrypts with the receiver's public key. To provide authenticity, the senders encrypt with their own private key.

The preferred cryptographic tools also include certification services that support activities needed to verify that the certificates are properly used, to ensure the authenticity and confidentiality of communications and stored data. Key recovery services are also provided under the cryptographic tools. Data encrypted under a public key cannot be recovered without the private key. If the private key is rendered inaccessible (through file corruption, token destruction, or failure), it is essential that the cryptosystem owner/operator provide a means for recovering that data. As such, the key recovery services allow private keys to be recovered in case the private key is lost or damaged.

The preferred cryptographic tools also include revocation services. In any public key cryptosystem, keys will eventually be compromised, either because they are lost or stolen. The revocation services allow users to notify an administrator if their keys are compromised, to disseminate the list of compromised keys to all participating entities, and to issue new keys to replace compromised keys. Since public key binding is typically carried out using X.509 compliant certificates, this process may also be referred to as certificate revocation.

Figure 3:
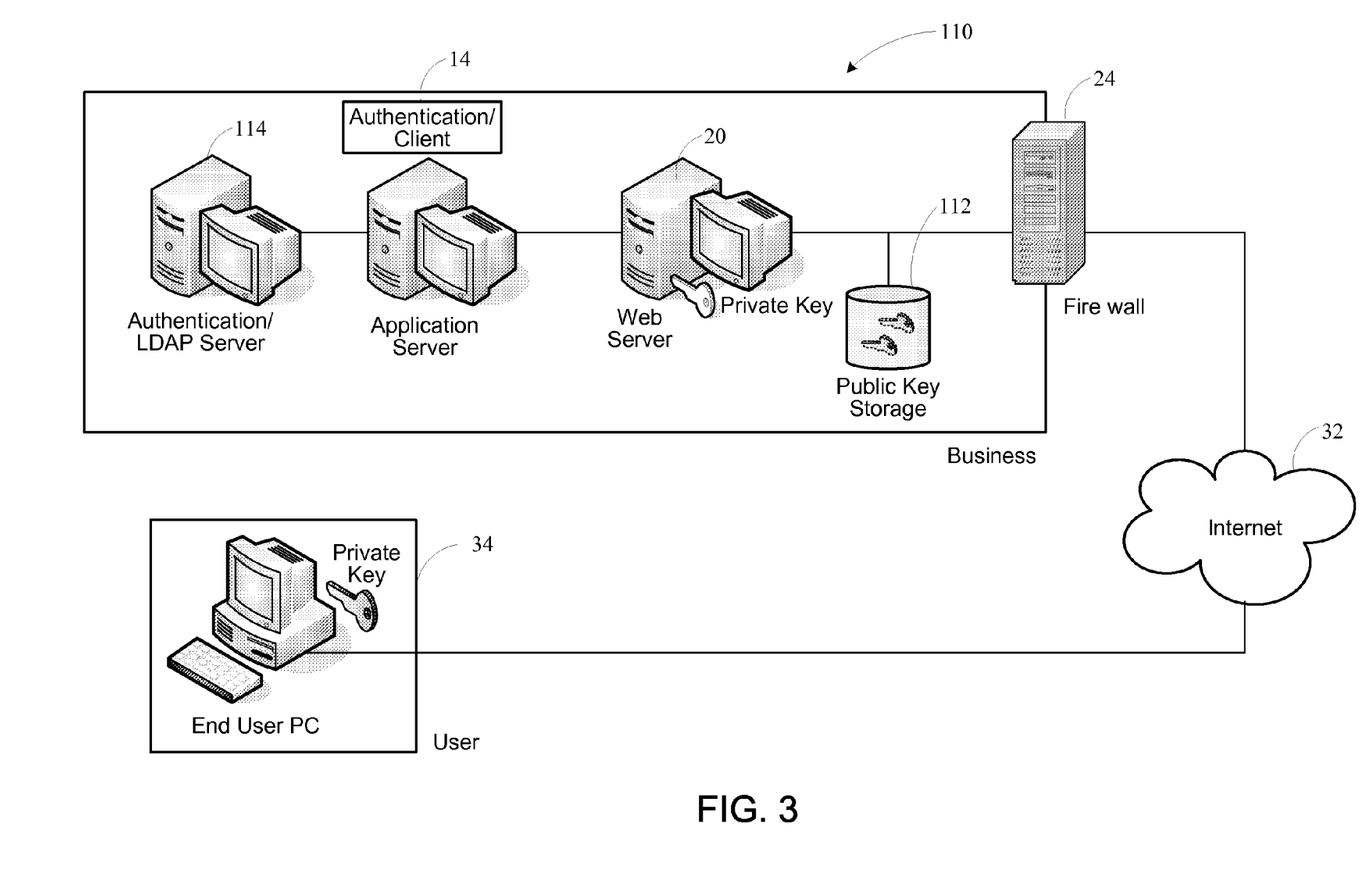
FIG. 3 illustrates a preferred implementation of public key cryptography for the security tools of the operations architecture.

Referring to FIG. 3, a preferred implementation of public key cryptography for the netcentric computing system 12 is illustrated. The remote client 34 has a personal private key stored on an encrypted file in the client 34 or possibly on a more secure device such as a smart card. The client has access to a repository 112 used for a public key storage to obtain public keys of other entities. The web server 20 has its own private key stored in a secure file or cryptographic device in the web server 20. The combination of a public and private key pair associated with the web server 20 and the remote client 34, along with cryptographic software on either end, enable the two entities to authenticate to each other, send encrypted data, and digitally sign documents over the Internet connection 32. In some cases, an authentication server 114, or directory service such as LDAP, can be used to validate the user's current access rights to the system. Authentication services and directories are often used to supplement certification revocation lists to provide faster and more granular authorization.

As illustrated in FIG. 1, the preferred operations architecture 10 also includes user administration tools 100. The netcentric computing system 12 introduces many new challenges to the task of user administration. The majority of these stem from the dramatically increased number of system components. Adding a user to the netcentric computing system 12 may require adding a user to the network, one or more server 16, 18, 20 operating systems, one or more database systems (so that the user can access data), an e-mail system, and an existing host-based system. In some cases, the addition of a user may require entries to be added to several individual system components. The preferred user administration tools 100 allow an administrator to add users to the netcentric computing system 12 in an orderly and automated fashion to eliminate the problems encountered when adding users. The preferred user administration tools 100 also allow the administrator to delete users from the netcentric computing system 12. Unless careful records are kept, it can be very difficult to determine to which machines, databases, and applications the user had been added originally so that this information can be deleted. From an administration standpoint this may seem to be only a headache, but from a security standpoint it represents a substantial risk. The preferred user administration tools 100 keep track and allow the deletion of users to be accomplished in an orderly and automated fashion.

Most user administration products on the market today focus on the operating system aspect of the problem (adding user access to the server, setting file permissions, group associations). Although these solutions are certainly helpful, they do not cover many of the more difficult user administration challenges such as database access, e-mail, and networking software. Each of these products often comes with its own administration tools which may simplify the individual administration tasks but do little to help with providing an integrated user administration approach. The preferred user administration tools 100 provide an integrated approach to handling the types of access that users are granted to the netcentric computing system 12.

An alternative approach to the user administration tools is to implement a single sign-on (SO) application in the netcentric computing system 12. These applications are meant to eliminate the need for users to remember user names and passwords to all of their business applications. The first time they log in, users enters a user name and password into the SSO application which then automatically logs into applications through a scripting process. An advantage to this approach is that through implementing SSO, a database that maps users to the applications they access is created. This significantly simplifies user administration, and can increase security as well. A key drawback to SSO applications is failover. If a SSO server fails, users cannot access applications as they do not remember passwords to all their applications.

The preferred operations architecture 10 also includes production control application set 102. In distributed environments, processes may be taking place across the entire system on multiple platforms in either a parallel or a serial fashion. Batch dependencies may be required across platforms, and multiple time zones may be involved. In addition, many non-mainframe-based applications do not provide production scheduling capabilities included with the application. For these reasons, scheduling processes across the netcentric computing system 12 can be quite complex, requiring significant management effort to ensure that the processes run smoothly. The preferred production control application set 102 includes print management tools, file transfer and control tools, mass storage management tools, backup and restore tools, archiving tools, and system startup and shutdown tools that ensure that processes run smoothly on the netcentric computing system 12.

The print management tools include applications that handle printing documents on the netcentric computing system 12. The file transfer and control tools handle the transferring of files from one location to another location in the netcentric computing system 12. The mass storage management tools monitor and control database files and various other kinds of data files that are stored in the netcentric computing system 12.

The backup and restore tools are used by the netcentric computing system 12 to backup and restore files that are used on the netcentric computing system 12. Backup and restoration processes become more complex in a distributed environment as business-critical information becomes distributed across the netcentric computing system 12. Backup strategies used coordinate information across the netcentric computing system 12 and determine where the backup copy or copies of information will reside. As with centralized computing environments, restoration processes are directly dependent on how backup was performed. A single restore process no longer suffices. Depending on a particular fault, restoration services may only need to be performed for a portion of the netcentric computing system 12, while the rest of the netcentric computing system 12 stays up and running.

The archiving tools include applications that are responsible for archiving files on the netcentric computing system 12. The issues surrounding archiving are quite similar to those surrounding backup. The archiving tools place limitations on the amount of information that may be archived on the netcentric computing system 12 as a result of the space limitations on servers 16, 18, 20 and clients 14, 34. Additional problems are created with archiving in a distributed environment, because users have no incentives to perform housekeeping tasks on their devices. Depending on the users' ability to store information on the clients 14, 34 or on the server 16, 18, 20, the clients 14, 34 may become cluttered with seldom-used files. Lack of space may affect other processes that need to take place on these devices, such as software and data distribution. The preferred archiving tools solve these problems by providing regular archiving procedures that automatically archive a predetermined set of files.

Referring to FIG. 1, the preferred operations architecture 10 also includes a help desk tool 104. The netcentric computing system 12 puts the operations help desk tools 104 closer to the "end user" in terms of visibility and influence. The help desk tools 104 are integrated with the business processes being supported through the netcentric computing system 12. If the help desk tools 104 are well integrated with the business process, there is risk, that the user may be given incorrect information, be forwarded to the wrong department, or otherwise mishandled. It is also important that the information collected by the help desk tools 104 about a user be properly shared with other stakeholders in the business process, which is also provided by the preferred help desk tools 104.

The preferred help desk tools 104 turn web browsers on the clients 14, 34 into interactive clients of the help desk with the power to enter, query and modify help desk requests. The preferred help desk tools 104 allow users to directly perform most of the help services provided by the help desk tools 104 without assistance from the help desk staff. As such, the preferred help desk tools 104 are capable of providing automated assistance to users on the clients 14, 34.

Another key function provided by the help desk tools 104 in the netcentric computing system 12 is for users to more effectively support themselves. In Internet environments, it is usually prohibitively expensive for a service provider to provide interactive help desk support to all interested Internet users. This is due to potential volumes of support requests as well as the diversity of technical environments that could be encountered. Consequently, it is often more reasonable to provide Internet users with access to the required applications of the help desk tools 104. In the preferred embodiment, the preferred help desk tools 104 include a download site where patches, drivers, and self-help support materials are available.

The help desk tools 104 also use metrics to measure the performance of support personnel that consider interactions via e-mail or video. An example metric might be the "number of e-mails answered per hour." In addition, existing metrics may need to be refined to fairly reflect netcentric characteristics. Those skilled in the art would recognize that several metric values can be monitored and kept track of by the netcentric computing system 12.

The preferred help desk tools 104 are available continuously in the netcentric computing system 12. In addition, in netcentric computing systems 12 there may be additional complexities of help desk operations introduced by global interactions. For example, the preferred help desk tools 104 support web page generation and e-mail support using multiple languages. Those skilled in the art would recognize that the applications used in the preferred help desk tools 104 will vary depending on the needs of each particular enterprise.

As set forth above, the operations architecture 10 consists of different operations tools that focus on different functions, such as the help desk tools or fault management and recovery management tool 84. Each tool introduces a predetermined set of operations services such as core management logic and event generation. Although product selection decisions are often based on the functions that a product provides, true integration of these tools into a cohesive operations architecture requires a service-based view, rather than a functional view and many specialized applications to integrate the tools.

It is therefore important to consider the services provided by the operations architecture tools when selecting operations tools. The services provided by the operations architecture 10 are core management logic, integration platform, event/data generation, event processing, and repositories.

The core management logic services apply business roles to management data. Core management logic is typically specific to the function being served by an operations tool. For example, core management logic of a backup/restore application of the production control application set 102 would initiate a backup process based on the time of day information it receives from a system clock. Core management logic receives data from event/data generation, event processing, and repositories services and then sends data for presentation or to repositories services. In addition, core management logic often polls the event/data generators for information.

The integration platform services provide a common platform for the tools of the operations architecture 10. At the lowest level this means common standards, interfaces, message formats, and file logging forms to be used with all the tools. Though the integration platform can be homegrown, these applications are growing extremely complex, suggesting the use of one of many available third party integration platforms.

There are two types of third party platforms available. The first group are framework type products such as HP Open View, Calif.-Unicenter TNG, and Tivoli Management Environment. These products are modular. Each module within the suite can be run separately; however, they all conform to a common framework which allows for greater compatibility, integration and better performance. The second type of integration platform is point-solution oriented. Products like Boole and Babbage implement this approach which typically results in best-of-breed solutions for various management solutions, but a larger amount of integration work between tools is required.

The event/data generation services interact with all the managed components in the execution and development environments in order to produce the required management information. The output of event/data generation services is actual raw management data that can then be processed and acted upon.

The event processing services manipulate the raw data obtained by event/data generation services into a form on which operations personnel can take action. This service may perform several functions such as event filtering, alert generation, event correlation, event collection and logging, and automatic trouble ticket generation. When management events are generated, event filtering mechanisms constantly compare predetermined event thresholds to current management events to determine the need for a management alert. If the threshold is exceeded, the event filtering function takes a specific action based on predetermined rules. When an event filter has noted the need for an alert, the alert generation function creates the proper notification. This may take one of several forms; a page, an email, a display change (icon changes color to red), etc.

Event correlation functions use logic to tie different events together with the intention of understanding potentials causes of problems. For example, nightly processing utilization shortages may be tied by event correlation functions back to a nightly batch job. It may be determined that historical analysis of management events is important. If so, the collection and logging of management events into repositories is important so that reporting and correlation activities can be performed at a future time. Automated trouble ticket generation. For certain events, it may be desirable for trouble tickets to be generated automatically in an organization's help desk system so that action can be taken.

The repository services contain all the management data generated or used during the management process. This data includes historical data, capacity data, performance data, problem knowledge bases, asset databases, solution sets, and management information bases (MIBs).

The preferred operations architecture 10 consists of a set of tools that allow administrators to effectively manage a distributed environment. While the invention has been described in its currently best known modes of operation and embodiments, other modes and embodiments of the invention will be apparent to those skilled in the art and are contemplated. For other features, advantages and combinations of the present invention refer to U.S. provisional application Ser. No. 60/156,962, which is herein incorporated by reference in its entirety.

What is claimed is:

1. An operations architecture for a netcentric computing system, comprising:

a server connected with a client;

said server configured to include a software distribution tool to provide automated delivery to, and installation of, an application on said server or said client;

said server configured to include a configuration and asset management tool to manage a plurality of predetermined assets connected with said netcentric computing system;

said server configured to include a fault management and recovery management tool to assist in the diagnosis and correction of a plurality of system faults in said netcentric computing system;

said server configured to include a capacity planning tool to monitor a plurality of predetermined system usage levels in said netcentric computing system;

said server configured to include a performance management tool executable with said server to monitor performance of applications running on said netcentric computing system;

said server configured to include a license management tool executable with said server to manage and control license information for applications running on said netcentric computing system;

said server configured to include a remote management tool to allow support personnel from said netcentric computing system to take control of said client;

said server configured to include an event management tool to handle a plurality of predetermined events in said netcentric computing system;

a server configured to include a systems monitoring and tuning tool to monitor applications, middleware, databases, networks, said client and said server;

said server configured to include a security tool that includes a security application to provide security to said netcentric computing system, said security tool configured to limit access of said client to said server based on role based access control;

said server configured to include a user administration tool to administer users of said netcentric computing system;

said server configured to include a production control application set to schedule and handle a plurality of production processes on said netcentric computing system, said production control application configured to automatically archive a predetermined set of files; and said server configured to include a help desk tool including a help application to provide users of applications on said netcentric computing system with assistance, said help desk tool adapted to measure the performance of support personnel.

2. The operations architecture of claim 1, wherein said predetermined assets is selected from the group consisting of said server, said client, a product license information file, a warranty information file, a vendor name file, a logical device information file and a physical device information file.

3. The operations architecture of claim 1, wherein said system usage levels is selected from the group consisting of server processing usage, server bandwidth usage, server storage usage and client usage.

4. The operations architecture of claim 1, wherein said predetermined events that said event management tool handles is selected from the group consisting of disk space indications, central processing unit utilization, database error indications, network error indications and file and print server indications.

5. The operations architecture of claim 1, wherein said production control application set is selected from the group consisting of a print management tool, a file transfer and control tool, a mass storage management tool, a backup and restore tool, a archiving tool and a system startup and recovery tool.

6. A method of providing an operations architecture for a netcentric computing system including a client and a server, comprising the steps of:

said server executing a software distribution tool for providing automated delivery to, and installation of, a predetermined application on said server or said client;

said server managing a plurality of predetermined assets connected with said netcentric said server computing system with a configuration and asset management tool;

said server assisting in the diagnosis and correction of a plurality of system faults in said netcentric computing system with a fault management and recovery management tool;

said server monitoring a plurality of predetermined system usage levels iii said netcentric computing system with a capacity planning tool;

said server monitoring the performance of applications running on said netcentric computing system with a performance management tool;

said server managing and controlling license information for applications running on said netcentric computing system with a license management tool;

said server allowing support personnel to take control of said client with a remote management tool;

said server handling a plurality of predetermined events in said netcentric computing, system with a event management tool;

said server monitoring a plurality of computing devices connected with said netcentric computing system with a systems monitoring and tuning tool;

said server securing said netcentric computing system with a security tool configured to limit access to said netcentric computing system based on role based access control;

said server administering users of said netcentric computing system with a user administration tool;

said server scheduling and handling a plurality of production processes on said netcentric computing system with a production control application set, said production control set configured to automatically archive a predetermined set of files;

said server helping users encountering problems with applications on said netcentric computing system with a help desk tool;

and said server monitoring performance of support personnel helping users encountering problems, said performance being measured by the number of users helped per a time period.

7. The method of claim 6, wherein said predetermined assets is selected from the group consisting of said server, said client, a product license information file, a warranty information file, a vendor name file, a logical device information file and a physical device information file.

8. The method of claim 6, wherein said system usage levels is selected from the group consisting of server processing usage, server bandwidth usage, server storage usage and client usage.

9. The method of claim 6, wherein said predetermined events that said event management tool handles is selected from the group consisting of disk space indications, central processing unit utilization, database error indications, network error indications, application error indications and file and printer service indications.

10. The method of claim 6, wherein said production control application set is selected from the group consisting of a print management tool, a file transfer and control tool, a mass storage management tool, a backup and restore tool, a archiving tool and a system startup and recovery tool.

* * * * *

UNITED STATES PATENT AND TRADEMARK OFFICE
CERTIFICATE OF CORRECTION

PATENT NO. : 7,415,509 B1 Page 1 of 1
APPLICATION NO. : 09/676584
DATED : August 19, 2008
INVENTOR(S) : John K. Kaltenmark and Christopher M. Degiorgio It is certified that error appears in the above-identified patent and that said Letters Patent is hereby corrected as shown below:

In the Specification

Page 3, Column 1, 17$^{th}$ Reference, change "Shakeley," to --Blakeley,--

Column 8, Line 26, change "off" to --off.--

Column 16, Line 55, change "Even" to --Eve--

In the Claims

Column 23, Line 2, change "iii" to --in--

Column 23, Line 12, change "computing," to --computing--

Signed and Sealed this

Ninth Day of December, 2008

JON W. DUDAS
*Director of the United States Patent and Trademark Office*